United States Patent [19]

Imsand et al.

[11] 4,334,124
[45] Jun. 8, 1982

[54] FLOATING COORDINATE SYSTEM

[75] Inventors: Bruce E. Imsand; Robert L. Kuehlthau, both of Huntsville, Ala.

[73] Assignee: Intergraph Corporation, Huntsville, Ala.

[21] Appl. No.: 134,345

[22] Filed: Mar. 26, 1980

[51] Int. Cl.³ .............................................. G08C 21/00
[52] U.S. Cl. ...................................... 178/19; 178/18; 364/520
[58] Field of Search ............................ 178/18, 19, 20; 340/146.3 MA, 146.3 H, 365 R, 365 C, 365 E; 33/1 M; 364/520

[56] References Cited

U.S. PATENT DOCUMENTS

| 3,647,963 | 3/1972 | Bailey | 178/19 |
| 3,700,809 | 10/1972 | Nadon | 178/18 |
| 3,725,760 | 4/1973 | Bailey | 178/18 |
| 3,735,044 | 5/1973 | Centner et al. | 178/19 |
| 3,767,858 | 10/1973 | Rodgers | 178/18 |
| 3,801,733 | 4/1974 | Bailey | 178/19 |
| 3,873,770 | 3/1975 | Ioannou | 178/18 |
| 3,904,821 | 9/1975 | Whetstone et al. | 178/19 |
| 3,904,822 | 9/1975 | Kamm et al. | 178/19 |
| 3,956,588 | 5/1976 | Whetstone et al. | 178/19 |
| 3,983,322 | 9/1976 | Rodgers | 178/19 |
| 4,018,989 | 4/1977 | Snyder et al. | 178/18 |
| 4,022,969 | 5/1977 | McKinlay et al. | 178/18 |
| 4,022,971 | 5/1977 | Rodgers | 178/19 |
| 4,081,603 | 3/1978 | Davis et al. | 178/19 |

Primary Examiner—Thomas A. Robinson
Attorney, Agent, or Firm—Cushman, Darby & Cushman

[57] ABSTRACT

Apparatus for determining the position of a cursor with respect to a floating coordinate system, such as a menu. The floating menu incorporates two sensing devices similar to that in the cursor. A processing unit determines the position of the two sensing devices and the position of the cursor with respect to a fixed coordinate system. From this data the position of the cursor with respect to the floating menu is determined.

25 Claims, 3 Drawing Figures

FLOATING COORDINATE SYSTEM

BACKGROUND OF THE INVENTION

1. Field of the Invention

The present invention relates to coordinate entry devices for computer systems. More particularly, it relates to a floating coordinate system for such a coordinate entry device.

2. History of the Prior Art

Those skilled in the art will readily appreciate that many applications require the entry of location coordinates into a computer. For example, digitizing systems are well known in the art for inputting maps, blueprints or the like into a computer by considering such source documents as consisting of a number of features located at specific coordinates. Thus, after completion of the digitizing process, the computer stores the coordinates of all features on the source document.

In fact, any interactive system, in which data is entered into a computer by indicating, with a special pen, cursor or the like, a point on a board or cathode ray tube screen, necessarily involves the entry of coordinates.

In digitizing systems, features on a source document may be recorded by monitoring the location of a position indicator on a reference surface as it traces the source document features. Components in the position indicator interact with components associated with the reference surface to produce data indicative of the location of the position indicator. Such digitizing systems can be based on a number of different theories. For example, in electrostatic systems, as disclosed in U.S. Pat. Nos. 3,767,858, 3,983,322, 4,022,971 all to Rodgers, an electric field is created about the reference surface by conductors within the reference surface. The phase of the electric field along two coordinate axes varies with position so that the phase of the electric field, as detected by a position indicating device, uniquely determines the position of the device.

In magnetostrictive systems, as disclosed in U.S. Pat. Nos. 3,904,821 and 3,956,588 both to Whetstone et al, 4,018,989 to Snyder et al and 4,081,603 to Davis et al, vibrations are created along two coordinate axes in magnetostrictive material. A position indicator produces a signal when the vibrations are detected by it and the time between initiation and detection of the vibrations represents the location of the position indicator. Obviously, in such systems the vibrations may be created by the position indicator, and vibration sensors disposed at locations fixed with respect to the reference surface may be employed to determine the location of the position indicator.

Finally, electromagnetic systems, as disclosed in U.S. Pat. Nos. 3,904,822 to Kamm et al, 3,873,770 to Ioannou, 3,735,044 to Centner et al, 3,700,809 to Nadon, and 3,647,963, 3,725,760 and 3,801,733 all to Bailey, sense an electromagnetic field, created by either elements associated with the reference surface or elements associated with the position indicating device as an indication of position. The devices disclosed in the Bailey patents employ plural grid elements in the reference surface. The position indicator includes a coil which generates a magnetic field about the two sets of conductors. The ratio of the amplitudes of the signals induced in the two sets of conductors is indicative of relative position. Alternatively, the patents to Ioannou and Kamm disclose means for causing a magnetic field to sweep across a reference surface. A coil in the position indicating device detects the passage of the magnetic field. The period of time between the initiation of the magnetic field sweep and its detection by the position indicating device is related to the location of the position indicator transverse to the direction of the magnetic field.

The position indicating devices in these systems can be of several forms. In one form, the device is constructed with a flat bottom surface which is adapted to rest on the reference surface. Other position indicating devices are hand-held and include a body which is similar to a pen or pencil. All such position indicating devices shall be referred to hereinafter generically as "cursors". If the cursor is free to move away from the reference surface, (i.e., it is not mechanically connected to the reference surface) it will be referred to herein as a "free cursor".

No matter what type of system is employed to determine the position of a cursor on a reference surface in whatever application, it is often necessary to determine the position of a cursor with respect to more than one coordinate system. For example, in digitizing systems as described above, a "menu" is employed to select computer commands. For example, if an operator desires to store a circle at a particular location, rather than drawing or tracing a circle freehand, the circle command might be selected from the menu. Then the operator locates a first point on the reference surface indicative of the position of the center of the circle and a second point on the reference surface indicative of the radius of the circle. The computer then automatically stores a circle at the identified position.

In other applications, an operator might wish to associate a point on one source document with a point on a second source document. Thus, in a sense, the operator is associating a point in one coordinate system with a point in another coordinate system. In many other applications, it is necessary for an operator to constantly switch between working in one coordinate system and working in another coordinate system.

This switching has been accomplished in the prior art in several different manners. For example, one source document which is related to a first coordinate system can be removed from a reference surface and replaced by a second source document which is related to a second coordinate system. Then, instructions must be supplied to the computer that the source document and the coordinate system have been changed. If an operator must frequently switch between source documents, the operator's task is slow, tedious and inefficient.

Alternatively, systems have been developed with two independent reference surfaces with either one or two cursors. In such systems, an operator simply switches from board to board to switch from one coordinate system to another. Although this certainly speeds operations, drawbacks still exist. Specifically, the operator must still turn from one board to another which is both time consuming and exhaustive. If one of the reference surfaces is large and the other small, one reference surface may be positioned on top of the other reference surface. However, to obtain access to the lower reference surface, it will often be necessary to move the smaller reference surface. As can be imagined from the discussion hereinabove, the structure which must be associated with a reference surface to create or detect signals causes the reference surface to be quite heavy. Thus, a day's worth of moving the smaller reference surface about the larger reference surface proves to be a clumsy, tedious and exhausting task.

Additionally, such two reference surface systems tend to be wasteful, since supplying completely independent signal generating or sensing means in each of the two reference surfaces is duplicative. In precision digitizing equipment, such reference surfaces are made with a high degree of precision and are therefore expensive. Having two independent reference surfaces needlessly increases the cost of such systems.

BRIEF SUMMARY OF THE INVENTION

The present invention overcomes the problems with the prior art in providing a method and apparatus to enable an operator to quickly and easily switch between coordinate systems while entering coordinates in a computer. While the present invention does employ a second reference surface, the second reference surface does not include the signal generating or sensing apparatus employed in the first reference surface so that the second reference surface construction may be light and inexpensive.

Specifically, in the present invention, signal generating or sensing devices are attached to the second reference surface. These devices may be similar to the device in the cursor. The second reference surface and the cursor may then be disposed on the first reference surface. Circuitry is provided to detect the position of not only the cursor but also the second reference surface with respect to a first coordinate system defined by the first reference surface. The position of the cursor with respect to the second reference surface is then determined. An important aspect of the present invention is that the same type of sensing or generating device in the cursor may be employed in the second reference surface.

BRIEF DESCRIPTION OF THE DRAWING

These and other objects and advantages of the invention will become more apparent and more readily appreciated from the following detailed description of the presently preferred exemplary embodiment of the invention taken in conjunction with the accompanying drawings of which.

DESCRIPTION OF THE PREFERRED EMBODIMENT

The following is a description of the present invention employed in an electromagnetic free cursor digitizing system with a menu. From the following description, it will be obvious to one of ordinary skill in the art how the present invention may be employed in a different type of electromagnetic system, or any other type of system. It will be equally obvious how the present invention may be employed in applications other than digitization.

Figure 1:
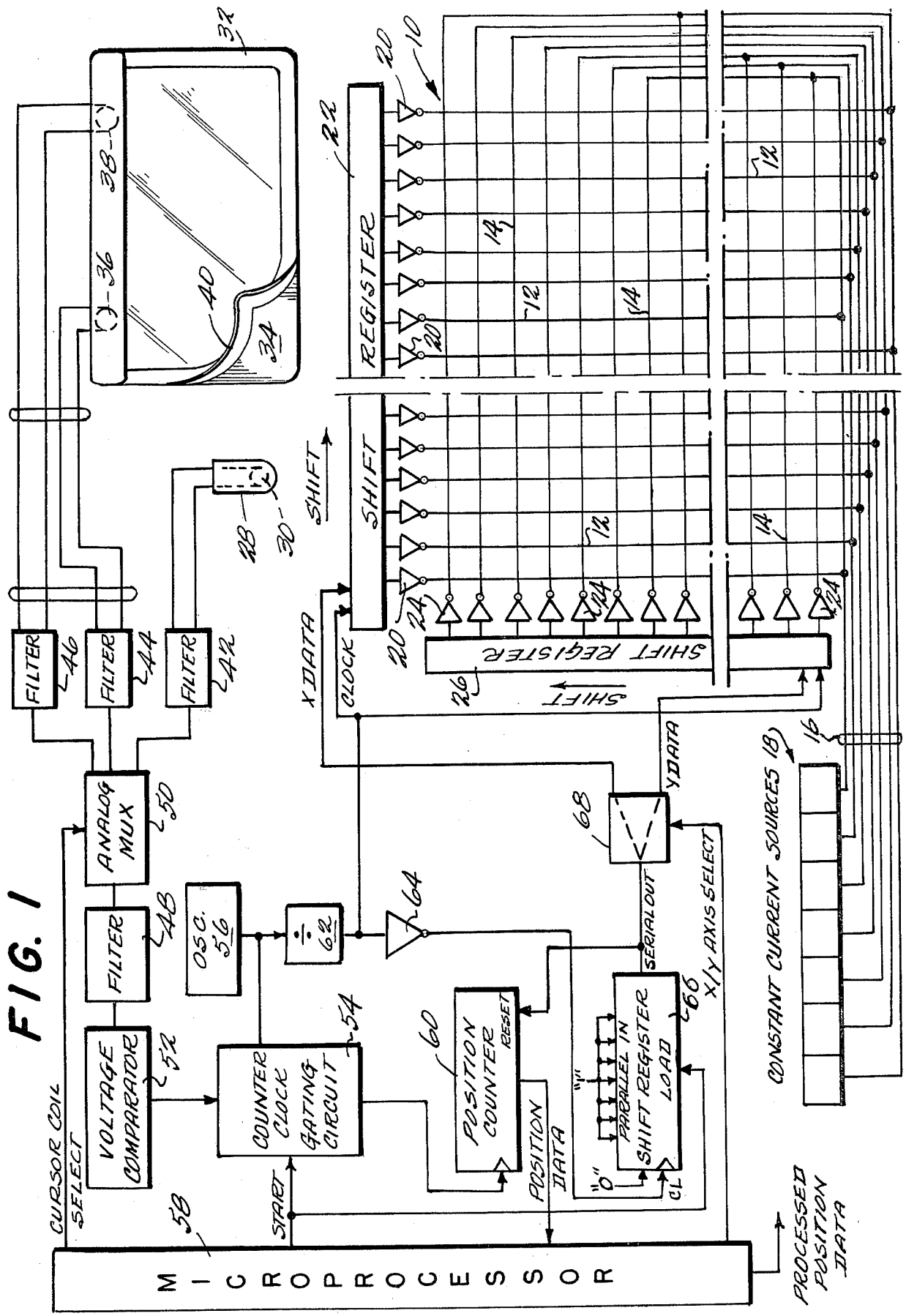
FIG. 1 is a circuit diagram of a system incorporating the present invention, including a top plan view of the second reference surface.

Referring to FIG. 1, a first reference surface such as digitizing table 10 includes a surface under which a number of unconnected wires are disposed. Specifically, wires 12 are positioned parallel to each other and wires 14 are positioned parallel to each other and perpendicular to wires 12. In the preferred embodiment, each wire 12 and 14 is positioned 0.200 inch from the adjacent parallel wire, and is electrically insulated.

One end of each wire 12 and 14 is connected via bus 16 to one of constant current sources 18. In the preferred embodiment, there are seven constant current sources and seven wires in bus 16. Each wire in each group of seven consecutive wires 12 or 14 is connected to a different constant current source 18 through bus 16.

The other end of each wire 12 is connected to a high current, open collector inverting buffer 20. Each buffer 20 is driven by an output terminal of serial in, parallel out shift register 22. In a like manner, the other end of each wire 14 is connected to one of buffers 24 which are similar to buffers 20. Serial in, parallel out shift register 26 drives buffers 24 and may be similar to shift register 22.

Digitizing table 10, consisting of wires 12 and 14, buffers 20 and 24, shift registers 22 and 26 and bus 16, is an example of one possible first reference surface. Obviously, digitizing table 10 may be replaced with a large number of other reference surfaces operating on an electromagnetic principle or any other principle.

In the preferred embodiment, cursor 28 simply includes a transparent area with a cross hair at its center within approximately 90 turns of 34 gauge wire all mounted in a holder appropriate for the operator. The preferred embodiment of the present invention is incorporated in an electromagnetic position determining system so that coil 30 serves as a simple antenna. With other systems, coil 30 might be employed to generate a magnetic field, or coil 30 may be replaced with a different type of signal generator or sensor.

Figure 2:
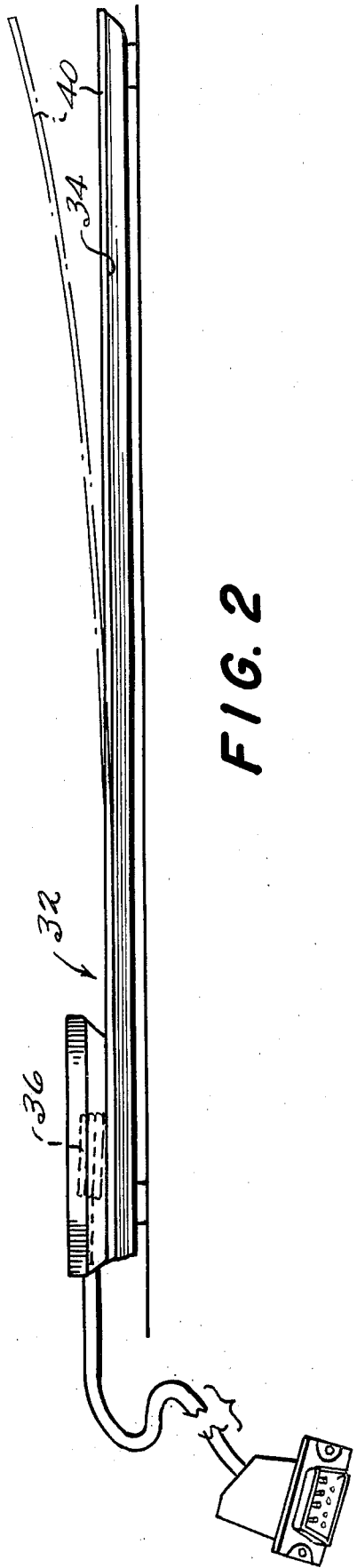
FIG. 2 is a side elevation of the second reference surface of the present invention.

Menu 32 has a flat top surface 34 covered by transparent sheet 40. A source document, such as a map or blueprint, may be positioned between sheet 40 and surface 34 and will be protected by sheet 40. As illustrated in FIG. 2, the lower surfaces of coils 36 and 38 are positioned on the upper surface of sheet 40 so that when cursor 28 is positioned on sheet 40, coils 36 and 38 are disposed the same distance from wires 12 and 14 as coil 30. In the preferred embodiment menu 32 is considered a "floating menu", since it is not connected to table 10. Menu 32 is primarily composed of a rigid plastic, coils 36 and 38 are identical to coil 30, and sheet 40 is made of a flexible plastic.

Coils 30, 36 and 38 are connected to filters 42, 44 and 46, respectively, each of which together with filter 48 comprise a bandpass filter having a center frequency of about 3 Khz in the preferred embodiment.

Disposed between filters 42, 44 and 46 and filter 48 is analog multiplexer 50 which determines which of filters 42, 44 or 46 is connected to filter 48. In the preferred embodiment, filtering occurs in two stages on opposite sides of analog multiplexer 50. However, it will be obvious to one of ordinary skill in the art that the filtering can occur in one stage on either side of the multiplexer. If the filtering occurs before multiplexing, three filters are needed for the three coils 30, 36 and 38. If the filtering occurs after the multiplexing, only a single filter is necessary. The arrangement of the preferred embodiment was dictated primarily by the nature of the off-the-shelf filter components readily available to the inventors.

The output of filter 48 is connected to voltage comparator 52. Comparator 52 may detect slope polarity and/or voltage level and produces an output signal when predetermined signal conditions are identified.

This comparison signal is applied to counter clock gating circuit 54.

Gating circuit 54 has three inputs and a single output. A second input accepts a signal from oscillator 56 which in the preferred embodiment operates at 15 Mhz. The third input of gating circuit 54 is connected to microprocessor 58. Upon a signal from microprocessor 58, gating circuit 54 transfers the input from oscillator 56 to the output until a signal is received from comparator 52. Those skilled in the art will readily appreciate that gating circuit 54 may consist of an RS flip-flop and an AND gate.

The output of gating circuit 54 is applied to counter 60 which, in the preferred embodiment, is a 16 bit counter. The output of counter 60 is applied to microprocessor 58. In addition to being connected to gating circuit 54, oscillator 56 is connected to frequency divider 62 which in the preferred embodiment divides the frequency of oscillator 56 by 200 to produce a 75 Khz signal. The output of frequency divider 62 is applied to the clock inputs of shift registers 22 and 26. After passing through inverter 64 (which is employed for timing purposes), the output of divider 62 is applied to the clock input of serial and parallel in, serial out shift register 66. The parallel input terminals of this device are all tied to high signals or "1"s. This data is loaded in shift register 66 by the same command from microprocessor 58 that causes the output of oscillator 56 to be applied to counter 60. As the "1"s are shifted out of shift register 66 in response to signals from inverter 64, low signals or "0"s are shifted into shift register 66. The output of shift register 66 is selectively applied to the data input of either shift register 22 or shift register 26 as controlled by gate 68, which is, in turn, controlled by microprocessor 58.

The operation of this circuitry will be described below in conjunction with the timing diagram illustrated in FIG. 3.

In the system associated with the preferred embodiment of the present invention, the x and y coordinates of coils 30, 36 and 38 with respect to a coordinate system fixed in relation to table 10 (the fixed coordinate system) are determined independently of one another at different times. Thus, one and only one axis is interrogated at a time.

Microprocessor 58, in this system, has the functions of selecting the axis to be interrogated, selecting the coil which will be monitored during interrogation, starting the interrogation, reading the coil position from the position counter, and computing the position of cursor 30 with respect to a coordinate system fixed in relation to floating menu 32 (the floating coordinate system). To initialize operations, microprocessor 58 selects: (1) the coil to be monitored by means of the coil select signals which control the operation of multiplexer 50, and (2) the axis to be interrogated by means of the X/Y select signal which controls gate 68. In the example illustrated in FIG. 3, the x axis is selected first by causing the X/Y select signal to be low and coil 30 will be monitored first by causing both coil select signals to be low.

Figure 3:
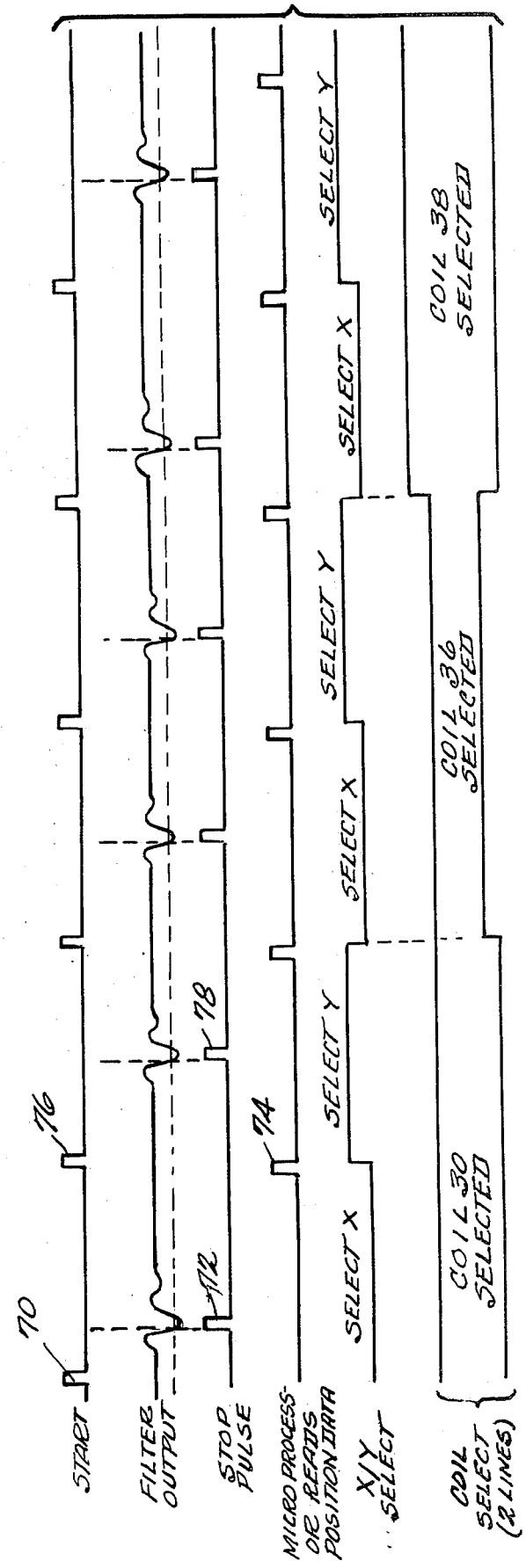
FIG. 3 is a timing diagram of the electrical signals at various points of the circuit illustrated in FIG. 1.

As illustrated in FIG. 3, processor 58 issues start command 70 which causes gating circuit 54 to conduct 15 Mhz pulses from oscillator 56 to the clock input of counter 60. Also, start pulse 70 causes shift register 66 to load the "1"s data at its parallel input. After shift register 66 is loaded, the 75 Khz signal from divider 62 is applied to the clock input of shift register 66. In addition, this 75 Khz signal also shifts the data in shift registers 22 and 26. As the serial data exits shift register 66, it enters shift register 22 since the x axis is selected. As data is shifted out of register 66, "0"s are shifted into register 66. After the last "1" is shifted out of register 66 into register 22, the reset signal to counter 60 is removed so that counter 60 begins counting the pulses of the 15 Mhz signal. Simultaneously, the seven "1"s in shift register 22 are shifted across the table at a 75 Khz rate. When a bit of shift register 22 has a value of "1", its associated buffer 20 is activated causing a constant current to be channelled through the connected wire 12. As long as there are seven or less contiguous "1"s in only one of shift registers 22 and 26, the current from each of the seven current sources is channelled through only one wire and is not divided between wires.

As the seven "1"s are shifted across shift register 22, the group of seven conductors which carry seven identical currents shift across table 10. Each conductor of the group carries a precise constant current to generate a precise magnetic field about itself. Thus a uniform magnetic field translates across table 10.

As the magnetic field sweeps across the table, changes occurring in the intensity and direction of the magnetic field generate small precise currents in coils 30, 36 and 38. The polarity of each of these precise currents reverse as the net change in magnetic flux cutting the associated coil goes to zero as the magnetic field passes beneath the coil.

Since coil 30 is to be monitored first, the current flowing therethrough passes through analog multiplexer 50 and filter 48 to comparator 52. Since filters 42 and 48 create a high Q system, the signal generated by coil 30 rings as illustrated in the filter output signal illustrated in FIG. 3. A threshold is detected in this signal by voltage comparator 52. In the preferred embodiment, to simplify the circuitry involved, the threshold point is selected to be a voltage which not only occurs only once in a given monitoring cycle, but also minimizes variation in threshold detection with respect to the distance between the plane containing wires 12 and 14 and the coil being monitored. Experimentation has determined that the best threshold voltage is a negative voltage. Upon detection of this particular voltage by comparator 52, a pulse is generated which is applied to gating circuit 54 to stop the transfer of 15 Mhz pulses from oscillator 56 to counter 60. The time between start pulse 70 and stop pulse 72 (see FIG. 3) is proportional to the x coordinate of coil 30. Since the count in counter 60 is proportional to the time between pulse 70 and pulse 72, it is also proportional to the x coordinate of coil 30.

After counter 60 has been stopped, microprocessor 58 reads the positional data from counter 60. In FIG. 3, pulse 74 represents an internal signal of microprocessor 58 which enables the reading of the positional data.

It is then necessary to determine the y coordinate of coil 30. Microprocessor 58 causes the X/Y select signal to become high so that gate 68 channels the output of register 66 to shift register 26. Start pulse 76 from microprocessor 58 then causes data at the parallel input of shift registers 66 to be loaded. The 75 Khz signal from divider 62 shifts the data serially out of shift register 66 and into the shift register 26. Again after the last "1" has been shifted out of register 66, the reset signal to counter 60 is lifted so that counter 60 begins counting at a frequency of 15 Mhz. As soon as the magnetic field reaches coil 30 the output of coil 30 crosses the threshold as detected by comparator 52 so that stop pulse 78 is produced. Again, the count in counter 60 is proportional to the y coordinate of coil 30. Microprocessor 58 then reads the count in counter 60.

This reading step ends the acquisition of data regarding the position of coil 30. Microprocessor 58 then alters one of the coil select signals to cause filter 44 to be connected through multiplexer 50 to filter 48. The procedure outlined above is repeated to determine the x and y coordinates of coil 36. Finally, the coil select signals are again modified so that the signal from filter 46 passes to filter 48 so that coil 38 is monitored. The position of coil 38 with respect to the x and y axes is then determined in the same manner.

Approximately 7 to 15 milliseconds are provided between adjacent start pulses in the preferred embodiment. Enough time must be allowed to let all of the "1"s bits shift out of registers 22 and 26 before another start pulse issues. The actual time for this to occur obviously depends on the size of the board and the frequency at which the data is shifted.

Once the position of floating menu 32 and cursor 28 is known with respect to a coordinate system fixed with respect to table 10 (the fixed coordinate system), the position of cursor 28 can easily be determined with respect to a coordinate system fixed with respect to floating menu 32 (the floating coordinate system). For example, assume that the floating coordinate system has one axis parallel to the center of coils 36 and 38. Obviously, the coordinates of the centers of coils 36 and 38 are fixed with respect to the floating coordinate system. Then:

$$x' = (x - x_0) \cos \theta + (y - y_0) \sin \theta$$

$$y' = (y - y_0) \cos \theta - (x - x_0) \sin \theta$$

where $(x_0, y_0)$ represents the position of the center of the floating coordinate system in the fixed coordinate system, $(x,y)$ represents the position of cursor 28 in the fixed coordinate system, $(x',y')$ represents the position of cursor 28 in the floating coordinate system, and $\theta$ is the angle between the x-axis of the two coordinate systems. If the x axis of the floating coordinate system is parallel to the line connecting the center of coils 36 and 38, then the tangent of angle $\theta$ is the ratio of the difference in the y coordinates to the difference in the x coordinates of coils 36 and 38.

After microprocessor 58 has determined the position of coil 30 with respect to the floating coordinate system, microprocessor 58 can then easily determine whether cursor 28 is on floating menu 32. In the preferred embodiment, the size of floating menu 32 is standard so that the corner coordinates of floating menu 32 may be either calculated from the coordinates of coils 36 and 38 or stored. Obviously, these corner coordinates are fixed with respect to the floating coordinate system.

If microprocessor 58 determines that cursor 28 is on floating menu 32, the data outputted from microprocessor 58 will so indicate and also give the position of cursor 28 with respect to the floating coordinate system. If cursor 28 is not on floating menu 32, the data outputted from microprocessor 58 will so indicate and give the position of cursor 28 with respect to the fixed coordinate system.

Since each wire 12 and 14 is 200 thousandths of an inch from the adjacent parallel wire and since counter 60 accumulates 200 counts between the start of current conduction in adjacent wires 12 or 14, the resolution of the system described above is to 1 thousandth of an inch.

In the preferred embodiment, seven "1"s are loaded into shift register 66 and there are seven constant current sources 18. As long as the number of "1"s loaded in register 64 is not greater than the number of constant current sources 18, the particular number of "1"s and current sources can vary. The key consideration is that as uniform a magnetic field as possible is desired for sweeping across table 10. If only one wire at a time is energized, any flaw in that wire affects the magnetic field. As the number of wires energized at one time increases, the flaws in any one wire tend to average out so the field becomes more uniform. With seven wires energized at a time the magnetic field is sufficiently uniform to obtain accurate measurements to the resolution limit of the system.

Although only one exemplary embodiment of this invention has been described in detail above, those skilled in the art will readily appreciate that many modifications are possible in the exemplary embodiment without materially departing from the novel teachings and advantages of this invention. For example, in view of the teachings hereinabove, it would be easy for one of ordinary skill in the art to adapt the floating coordinate system of the present invention for use either in other electromagnetic type systems or even systems which operate on different principles.

Accordingly, all such modifications are intended to be included within the scope of this invention as defined in the following claims.

What is claimed is:

1. A method for determining the position of a device with respect to a first coordinate system and a second coordinate system in a computer coordinate entry system comprising the steps of:
   producing data related to the position of said device with respect to said first coordinate system;
   producing data related to the position of said second coordinate system with respect to said first coordinate system; and
   generating from said device positional data and said second coordinate system positional data a signal related to the position of said device with respect to said second coordinate system.

2. A method as in claim 1 wherein said device positional data producing step comprises the steps of:
   translating a uniform magnetic field along an axis of said first coordinate system; and
   determining the time between initiation of said translating step and arrival of said magnetic field at said device, said time being related to the position of said device with respect to the axis of said first coordinate system along which said magnetic field translates.

3. In a method for generating cursor positional data related to the position of a free cursor with respect to a first coordinate system in a coordinate digitizing system, a method for determining the position of said free cursor with respect to a second coordinate system, movable with respect to said first coordinate system, comprising the steps of:
   generating data related to the position of said second coordinate system with respect to said first coordinate system; and
   generating from said cursor positional data and said second coordinate system positional data a signal related to the position of said cursor with respect to said second coordinate system.

4. A method as in claim 3 wherein said cursor positional data producing step comprises the steps of:
   translating a uniform magnetic field along an axis of said first coordinate system; and
   determining the time between initiation of said translating step and arrival of said magnetic field at said cursor, said time being related to the position of said cursor with respect to the axis of said first coordinate system along which said magnetic field translates.

5. A method as in claim 1 or 3 wherein said second coordinate system positional data producing step comprises the steps of:
   translating a uniform magnetic field along an axis of said first coordinate system; and
   timing the period between initiation of said translating step and arrival of said magnetic field at said second coordinate system, said period being related to the position of said second coordinate system with respect to the axis of said first coordinate system along which said magnetic field translates.

6. A floating coordinate system for use with a computer coordinate entry system, said coordinate entry system producing data related to the position of a device with respect to a fixed coordinate system, said floating coordinate system comprising:
   a reference surface movable with respect to said fixed coordinate system and fixed with respect to said floating coordinate system;
   means for producing data related to the position of said reference surface with respect to said fixed coordinate system; and
   means, responsive to said reference surface positional data and said device positional data, for generating a signal related to the position of said device with respect to said floating coordinate system.

7. In a computer coordinate entry system for determining the position of a device with respect to a first coordinate system including a first reference surface fixed with respect to said first coordinate system and first means for producing data related to the position of said device with respect to said first coordinate system, a system for determining the position of said device with respect to a second coordinate system, movable with respect to said first coordinate system, comprising:
   a second reference surface movably disposed on said first reference surface, said second coordinate system fixed with respect to said second reference surface;
   second means, cooperating with said first means, for producing data related to the position of said second reference surface with respect to said first coordinate system; and
   means, responsive to said device positional data and said second reference surface positional data, for generating a signal related to the position of said device with respect to said second coordinate system.

8. A coordinate digitizing system for determining the position of a free cursor with respect to a first coordinate system and second coordinate system comprising:
   a first reference surface fixed in position with respect to said first coordinate system;
   first means for producing data related to the position of said free cursor with respect to said first coordinate system;
   a second reference surface movably disposed on said first reference surface, said second coordinate system fixed in position with respect to said second reference surface;
   second means, cooperating with said first means, for producing data related to the position of said second reference surface with respect to said first coordinate system; and
   means, responsive to said cursor positional data and said second reference surface positional data, for generating a signal related to the position of said free cursor with respect to said second coordinate system.

9. A computer coordinate entry system for determining the position of a device with respect to a first coordinate system and a second coordinate system comprising:
   a first reference surface fixed in position with respect to said first coordinate system;
   first means for producing data related to the position of said device with respect to said first coordinate system, said first means having a first portion attached to said device and a second portion disposed proximate said first reference surface;
   a second reference surface movably disposed on said first reference;
   second means, cooperating with said second portion, for producing data related to the position of said second reference surface with respect to said first coordinate system, said second means including third and fourth portions attached to said second reference surface, said third and fourth portions being fixed in position with respect to said second coordinate system; and
   means, responsive to said device positional data and said second reference surface positional date, for generating a signal related to the position of said device with respect to said second coordinate system.

10. In a coordinate digitizing system for determining the position of a free cursor with respect to a first coordinate system including a first reference surface fixed with respect to said first coordinate system and first means for producing data related to the position of said free cursor with respect to said first coordinate system, said first means having a first portion attached to said free cursor and a second portion disposed proximate said first reference surface, a system for determining the position of said free cursor with respect to a second coordinate system, movable with respect to said first coordinate system, comprising:
   a second reference surface movably disposed on said first reference surface;
   second means, cooperating with said second portion, for producing data related to the position of said second reference surface with respect to said first coordinate system, said second means including third and fourth portions attached to said second reference surface, said third and fourth portions being fixed in position with respect to said second coordinate system; and
   means, responsive to said cursor positional data and said second reference surface positional data, for generating a signal related to the position of said free cursor with respect to said second coordinate system.

11. In a coordinate digitizing system for determining the position of a free cursor with respect to a first coordinate system including a first reference surface fixed with respect to said first coordinate system and first means for producing data related to the position of said free cursor with respect to said first coordinate system, said first means having a first portion attached to said free cursor and a second portion disposed proximate said first reference surface, a system for determining the position of said free cursor with respect to a second coordinate system, movable with respect to said first coordinate system, comprising:

a second reference surface movably disposed on said first reference surface;

second means, cooperating with said second portion, for producing data related to the position of said second reference surface with respect to said first coordinate system, said second means including third and fourth portions attached to said second reference surface and each similar to said first portion, said third and fourth portions being fixed in position with respect to said second coordinate system; and means, responsive to said cursor positional data and said second reference surface positional data, for generating a signal related to the position of said free cursor with respect to said second coordinate system.

12. Apparatus as in claim 11 wherein:

said first portion comprises a coil attached to said free cursor;

said second portion comprises a first group of parallel wires, a second group of parallel wires disposed transversely with respect to said first group, and means for sequentially establishing, and subsequently, sequentially stopping current flow in said first group of wires and then said second group of wires to produce a magnetic field which translates uniformly across said first reference surface; and said generating means includes timing means for producing a signal related to the time between the initiation of each magnetic field translation and the time at which said magnetic field is sensed by said coil, said time being related to the distance said coil is disposed from the first wire energized in each of said groups.

13. Apparatus as in claim 12 wherein:

said third portion comprises another coil attached to said second reference surface;

said fourth portion comprises a third coil attached to said second reference surface; and said second producing means further comprises means for selectively applying the output of said another and third coils to said timing means.

14. Apparatus as in claim 12 wherein said current establishing and stopping means and timing means comprises:

a parallel in, serial out shift register;

a first serial in, parallel out shift register having a plurality of outputs, each of said outputs being connected to one end of one wire in said first group, respectively;

a second serial in, parallel out shift register having a plurality of outputs, each of said outputs being connected to one end of one wire in said second group, respectively;

means for selectively applying the output of said parallel in, serial out shift register to one of said first serial in, parallel out shift register and said second serial in, parallel out shift register;

a plurality of constant current sources connected to the other ends of said wires of said first and second groups;

means for shifting the data in said parallel in, serial out shift register, said first serial in, parallel out shift register and second serial in, parallel out shift register at a first frequency;

means for selectively comparing at least one of the amplitude and slope polarity of one of said coil, said another coil and said third coil with reference values and generating a comparison signal in response to a favorable comparison; and means for counting the number of pulses having a second frequency between energization of the first wire in each of said groups and said comparison signal, the count in said counting means being related to the distance of the coil having its output selectively compared to said first wire.

15. A computer coordinate entry system for determining the position of a device with respect to a first coordinate system and a second coordinate system comprising:

a first reference surface fixed in position with respect to said first coordinate system;

first means for producing data related to the position of said device with respect to said first coordinate system, said first means having a first portion attached to said device and a second portion disposed proximate said first reference surface;

a second reference surface movably disposed on said first reference surface;

second means, cooperating with said second portion, for producing data related to the position of said second reference surface with respect to said first coordinate system, said second means including third and fourth portions attached to said second reference surface and each similar to said first portion, said third and fourth portions being fixed in position with respect to said second coordinate system; and means, responsive to said device positional data and said second reference surface positional data, for generating a signal related to the position of said device with respect to said second coordinate system.

16. In a coordinate digitizing system for determining the position of a free cursor with respect to a first coordinate system including a first reference surface fixed with respect to said first coordinate system and first means for producing data related to the position of said free cursor with respect to said first coordinate system, said first means having a first portion attached to said free cursor and a second portion disposed proximate said first reference surface, a system for determining the position of said free cursor with respect to a second coordinate system, movable with respect to said first coordinate system, comprising:

a second reference surface movably disposed on said first reference surface;

second means, cooperating with said second portion, for producing data related to the position of said second reference surface with respect to said first coordinate system, said second means including third and fourth portions attached to said second reference surface and each similar to said first portion, said third and fourth portions being fixed in position with respect to said second coordinate system, said first, third and fourth portions having lower surfaces defining a plane substantially parallel to said first reference surface when said free cursor is operatively disposed on said second reference surface; and means responsive to said cursor positional data and said second reference surface positional data, for generating a signal related to the position of said free cursor with respect to said second coordinate system.

17. Apparatus as in claim 8, 10, 15 or 16 wherein said apparatus further comprises means for determining when said free cursor is on said second reference surface.

18. Apparatus as in claim 17 wherein said apparatus further comprises means for generating a signal related to the position of said free cursor with respect to said second coordinate system when said free cursor is on said second reference surface and means for generating a signal related to the position of said free cursor with respect to said first coordinate system when said free cursor is off said second reference surface.

19. Apparatus as in claim 10, 15 or 16 wherein:
said second reference surface comprises a board movable with respect to said first reference surface;
said third portion comprises a first coil mounted on the upper surface of said board; and
said fourth portion comprises a second coil mounted on the upper surface of said board.

20. A computer coordinate entry system for determining the position of the device with respect to a first coordinate system and a second coordinate system comprising:
a first reference surface fixed in position with respect to said first coordinate system;
first means for producing data related to the position of said device with respect to said first coordinate system, said first means having a first portion attached to said device and a second portion disposed proximate said first reference surface;
a second reference surface movably disposed on said first reference surface;
second means, cooperating with said second portion, for producing data related to the position of said second reference surface with respect to said first coordinate system, said second means including third and fourth portions attached to said second reference surface and each similar to said first portion, said third and fourth portions being fixed in position with respect to said second coordinate system, said first, third and fourth portions having lower surfaces defining a plane substantially parallel to said first reference surface when said device is operatively disposed on said second reference surface; and
means, responsive to said device positional data and said second reference surface positional data, for generating a signal related to the position of said device with respect to said second coordinate system.

21. Apparatus as in claim 6, 7, or 20 wherein said apparatus further comprises means for determining when said device is on said second reference surface.

22. Apparatus as in claim 21 wherein said apparatus further comprises means for generating a signal related to the position of said device with respect to said second coordinate system when said device is on said second reference surface and means for generating a signal related to the position of said device with respect to said first coordinate system when said device is off said second reference surface.

23. Apparatus as in claim 9 or 20 wherein:
said first portion comprises a coil attached to said device;
said second portion comprises a first group of parallel wires, a second group of parallel wires disposed transversely with respect to said first group, and means for sequentially establishing, and subsequently, sequentially stopping current flow in said first group of wires and then said second group of wires to produce a magnetic field which translates uniformly across said first reference surface; and
said generating means includes timing means for producing a signal related to the time between the initiation of each magnetic field translation and the time at which said magnetic field is sensed by said coil, said time being related to the distance said coil is disposed from the first wire energized in each of said groups.

24. Apparatus as in claim 23 wherein:
said third portion comprises another coil attached to said second reference surface;
said fourth portion comprises a third coil attached to said second reference surface; and
said second producing means further comprises means for selectively applying the output of said another and third coils to said timing means.

25. Apparatus as in claim 23 wherein said current establishing and stopping means and timing means comprises:
a parallel in, serial out shift register;
a first serial in, parallel out shift register having a plurality of outputs, each of said outputs being connected to one end of one wire in said first group, respectively;
a second serial in, parallel out shift register having a plurality of outputs, each of said outputs being connected to one end of one wire in said second group, respectively;
means for selectively applying the output of said parallel in, serial out shift register to one of said first serial in, parallel out shift register and said second serial in, parallel out shift register;
a plurality of constant current sources connected to the other ends of said wires of said first and second groups;
means for shifting the data in said parallel in, serial out shift register, said first serial in, parallel out shift register and second serial in, parallel out shift register at a first frequency;
means for selectively comparing at least one of the amplitude and slope polarity of one of said coil, said another coil and said third coil with reference values and generating a comparison signal in response to a favorable comparison; and
means for counting the number of pulses having a second frequency between energization of the first wire in each of said groups and said comparison signal, the count in said counting means being related to the distance of the coil having its output selectively compared to said first wire.

* * * * *